United States Patent [19]
Chen et al.

[11] Patent Number: 6,147,741
[45] Date of Patent: Nov. 14, 2000

[54] DIGITAL SCANNER EMPLOYING RECORDED PHASE INFORMATION AND METHOD OF FABRICATION

[75] Inventors: Diana Chen, Gilbert; Phil Wright, Scottsdale; George R. Kelly, Gilbert, all of Ariz.

[73] Assignee: Motorola, Inc., Schaumburg, Ill.

[21] Appl. No.: 08/806,272

[22] Filed: Feb. 25, 1997

[51] Int. Cl.$^7$ .................................................. G02F 1/13
[52] U.S. Cl. ........................ 349/202; 359/573; 359/196; 349/196
[58] Field of Search ............................. 349/1, 196, 202; 345/32, 56; 348/202; 359/577, 578, 196, 573

[56] References Cited

U.S. PATENT DOCUMENTS

| | | | |
|---|---|---|---|
| 3,391,972 | 7/1968 | Harris et al. ............................. | 359/303 |
| 3,503,670 | 3/1970 | Kosanke et al. ........................ | 349/196 |
| 3,520,590 | 7/1970 | Caulfield ................................. | 359/303 |
| 3,658,409 | 4/1972 | Shimbo et al. .......................... | 359/303 |
| 3,743,379 | 7/1973 | McMahon . | |
| 3,791,716 | 2/1974 | Borel et al. ............................. | 349/196 |
| 4,461,543 | 7/1984 | McMahon . | |
| 4,813,771 | 3/1989 | Handschy et al. ...................... | 349/196 |
| 4,836,657 | 6/1989 | Gunji et al. ............................. | 349/196 |
| 5,126,869 | 6/1992 | Lipchak et al. ......................... | 349/202 |
| 5,402,184 | 3/1995 | Ogrady et al. .......................... | 348/764 |
| 5,490,009 | 2/1996 | Venkateswar et al. ................. | 359/291 |
| 5,715,029 | 2/1998 | Fergason ................................. | 349/196 |

*Primary Examiner*—Kenneth Parker
*Attorney, Agent, or Firm*—Eugene A. Parsons; Lanny L. Parker

[57] ABSTRACT

A digital scanner composed of a plurality of individually addressable scanning elements. Each of the plurality of individually addressable scanning elements capable of operating in discrete states in response to digital input signals applied to the digital scanner, thereby providing for either a straight passage and optical deflections or displacements, of a light beam passing therethrough dependent upon the state of operation of each scanning element. The scanner thereby capable of steering light over many positions according to digital input signals.

21 Claims, 2 Drawing Sheets

DIGITAL SCANNER EMPLOYING RECORDED PHASE INFORMATION AND METHOD OF FABRICATION

FIELD OF THE INVENTION

The present invention pertains to the field of optical scanners, or beam steerers and a method of fabrication of such devices, and more particularly to the modulation of light.

BACKGROUND OF THE INVENTION

Scanning devices and scanning techniques are becoming increasingly popular in miniature visual displays to create an integrated image from an image source having a minimal number of pixels. In addition, scanning devices and techniques are becoming increasingly popular in sensing and tracking devices, and in the fields of optical computing, optical switching, optical storage and optical communications. Of relevance in the reduction in size of the image sources utilized in many of these devices, is the user's ability to process and integrate information, and the speed at which the information is able to be processed and integrated.

With regard to visual displays, the human visual system can process information no faster than approximately 60 Hz. Therefore, an image that is projected and scanned within 1/60th of a second to varying positions within a visual display is seen by the eyes of the viewer as one enlarged integrated image. This process, more commonly known as time-multiplexed imagery, can be utilized in the field of display technology through the use of scanners or beam steerers, and more specifically in the development of enhanced resolution miniature visual displays.

Scanning, or beam steering, devices utilized today can be found in many forms, most commonly continuous scan electro-mechanical or electro-optical scanners incorporating mirrors, galvanometric scanners, polygonal scanners, piezoelectric scanners and resonate scanners. Many of these types of scanners are quite large in size, therefore not amenable to the incorporation into a device that is small, lightweight, operates with low power consumption and is meant to be portable in nature. In addition, these scanners are complex and thus expensive to manufacture and in many instances utilize great amounts of power during operation.

Recent invention has brought about new scanning devices that are capable of being fabricated small enough in size and power requirements so as to be incorporated into portable products, such as pixellated and non-pixellated miniature scanners or spatial light modulators. Pixellated scanning devices generally require the use of a large number of interconnects to drive the device and achieve the desired number of phase changes. For instance, during operation of a pixellated miniature scanner of this type, varying voltages are required to be exerted upon specific areas of a liquid crystal cell dependent upon the phase shift required for that particular area of the cell. The result is a very complex drive circuitry where the required scanning angle and scanning aperture are large. In addition, non-pixellated scanners typically are capable of scanning over only two positions instead of continuous scanning. As a result of the large number of interconnects and extensive lithography required, manufacturing costs are increased.

Thus, there is a need for a small, fast speed, low power digital scanning device composed of a stack of individually addressable scanning elements, the scanning elements in combination allowing for the continuous /steering, or scanning, of light passing therethrough over many positions in response to the phase information recorded in the scanning elements during fabrication. Phase information is created under the influence of a ramp voltage applied thereto the individual scanning elements during operation, because of an induced change in the polarization of light passing therethrough by an applied voltage, or any combination thereof.

Accordingly, it is highly desirable to provide for a scanning device, that utilizes a plurality of individually addressable scanning elements, or liquid crystal phase spatial light modulator elements to deflect or displace the light passing through. The digital scanner allows the scanning of light passing therethrough over many positions in response to digital input signals which serve to turn "ON" and "OFF" the individual scanning elements according to the desired results.

It is a purpose of the present invention to provide a new and improved digital scanner for display resolution enhancement that is capable of deflecting light passing therethrough.

It is a still further purpose of the present invention to provide for a digital scanning device that is capable of deflecting or displacing a beam of light passing therethrough dependent upon the state of operation of the individual scanning elements which compose the device, more specifically due to digital input signals received by the device and/or the polarization of light passing therethrough.

It is a further purpose of the present invention to provide a digital scanner capable of incorporation into a new and improved visual display system for display resolution enhancement, thereby allowing for the incorporation of the scanner into miniature visual displays.

It is yet another purpose of the present invention to provide a digital scanner capable of use in optical switching systems, optical storage systems, optical computing systems, optical communications systems, data communication and telecommunication systems, sensing and tracking systems, or the like.

SUMMARY OF THE INVENTION

The above problems and others are substantially solved and the above purposes and others are realized in a digital scanner that is capable of scanning over many positions in response to digital input signals. The scanner is composed of a plurality of individually addressable bi-stable scanning elements, each of the plurality of bi-stable scanning elements capable of operating in two discrete states in response to digital input signals applied to the digital scanner, thereby providing for either a straight passage or an optical deflection/displacement, of a light beam passing therethrough the digital scanner.

In general, the digital scanner serves to spatially modulate or steer the light emitted by an image source, or a light source, over many positions by altering the directional path of the light passing therethrough. This is accomplished based on the principle that the structural organization of the molecules, which compose the liquid crystal material of each of the plurality of bi-stable scanning elements, or liquid crystal cells, is not rigid, meaning that the molecules can be reoriented. As a result the liquid crystal molecules contained within each of the individually addressable scanning elements are capable of deflecting the light beam passing therethrough based on their orientation. The exertion of an external stimulus on the liquid crystal material or lack thereof, dependent on scanning element fabrication (discussed presently), results in the reorientation of the molecular structure of the liquid crystal material, thereby causing the light passing therethrough to either pass straight through or be deflected/displaced as a result of undergoing a change in phase and/or polarization. Simply stated, the deflection of the light passing therethrough is a function of the molecular alignment of the liquid crystal material contained within each individual scanning element.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

DETAILED DESCRIPTION OF THE PREFERRED EMBODIMENT

Figure 1:
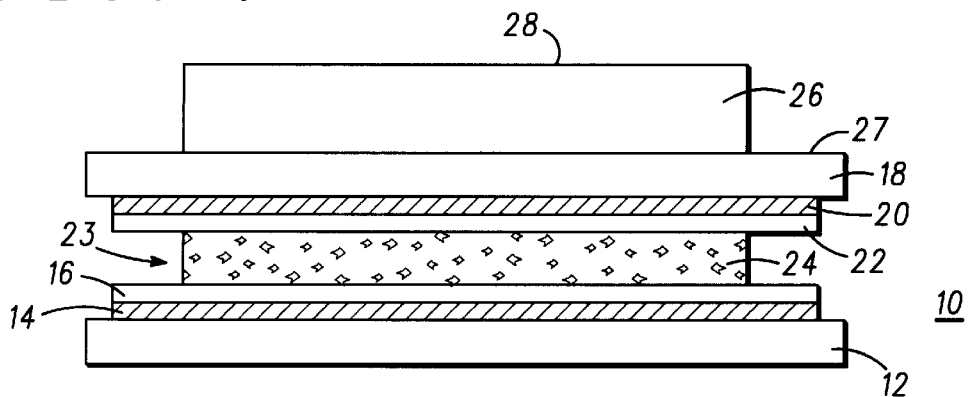
FIG. 1 is a simplified cross-sectional view of a single bi-stable scanning element according to a first embodiment of the present invention.

The present invention is based on utilizing individually addressable bi-stable scanning elements, or liquid crystal cells, that in combination compose a digital scanner capable of digitally scanning over many positions. In one particular application the digital scanner serves to increase the resolution for a given number of light emitting devices or to reduce the number of light emitting devices needed to achieve a desired resolution. More particularly, the light emitting display device serves as the image source for a visual display system whereby a resulting integrated image is formed by digitally scanning portions or the entire array of light emitting devices, through the digital scanner. The scanner allows for a straight passage or an optical deflection/ displacement of the light beam passing therethrough dependent upon the mode of operation of each of the individual scanning elements. This scanning action forms what appears to the observer to be a high resolution resultant integrated image. The scanning process utilized in the present invention is based on the principle of spatial phase modulation and/or changing the polarization of light passing therethrough the individual scanning elements, thereby altering the direction or position of light emitted by portions or the entire array of light emitting devices.

The digital scanner of the present invention is composed of a plurality of individually addressable bi-stable scanning elements. In a first embodiment, each of the bi-stable scanning elements includes a polarization switching cell and a birefringence film/crystal positioned adjacent the polarization switching cell. Light incident upon the digital scanner passes therethrough and undergoes a change in polarization according to input signals acting upon the cell, thus controlling the polarization between the x and y directions. The birefringence film/crystal, positioned adjacent the polarization cell, allows for the optical beam passing therethrough which is polarized along the x or y direction to be deflected to different angles or displaced to different positions. The birefringence film can be a liquid crystal device with phase grating structure stored in the device. In a second embodiment, the digital scanner is composed of a plurality of individually addressable bi-stable scanning elements, also referred to as non-pixellated liquid crystal phase spatial light modulators, each composed of a liquid crystal cell having no defined pixels and including a phase modulating material therein. Light passing therethrough the phase modulating material undergoes a change in phase, thus a change in directional path according to recorded phase information or phase information generated by an external voltage. It should be understood that any number of bi-stable scanning elements can be aligned to form the digital scanner of the disclosed embodiments of the present invention. In a third embodiment, the digital scanner is composed of a plurality of individually addressable scanning elements, also referred to as non-pixellated liquid crystal phase spatial light modulators, each composed of a liquid crystal cell having no defined pixels and including a phase modulating material therein. Light passing therethrough the phase modulating material undergoes a change in phase by applying a voltage ramp, resulting in continuously scanning over two positions. Each scanning element can resolve several positions between these two positions. It should be understood that any number of these scanning elements can be aligned to form the digital scanner of the disclosed embodiments of the present invention.

During operation, light entering the digital scanner undergoes polarization changes or phase modulation and subsequent deflection or displacement. At the time in which an external stimulus is applied, the molecular orientation of the liquid crystal material is altered, resulting in a change in polarization and/or a phase modulation of the light passing therethrough, or a lack thereof, dependent upon fabrication technique. Instead of utilizing defined pixels, the second embodiment of the scanner of the present invention under the influence of a ramp voltage creates phase information at intervals within the cell. Alternatively, phase information is recorded within each individual scanning element during fabrication, thus when an external voltage is applied, the molecular orientation of the liquid crystal material is altered, thus allowing the light to pass straight through. Irrespective of fabrication technique, the resulting phase modulation of the light passing therethrough allows for the image source, having minimal pixel numbers and low fill factor, in combination with the digital scanner to generate an integrated image by switching the polarization of the light passing therethrough and/or modulating the phase of light emitted therethrough in response to the presence or lack of a voltage exerted thereupon the individual bi-stable scanning elements. The resultant image appears to be composed of a much greater number of pixels, thus enhanced display resolution.

As previously stated, the purpose of this disclosure is to provide for a digital scanner and method of fabrication, that can be utilized in a miniature visual image display system, scanning and tracking devices, optical computing, optical communication, optical switching, optical storage devices, data communication and telecommunication devices, generally composed of a light emitting display device, the scanner, driver/control circuitry, and a plurality of optical elements. In the preferred embodiments, the use of the digital scanner to bring about the deflection of the light emitted by a display device, allows for the display system to remain small in size and permits it to be incorporated into miniature visual image displays such as those found in portable electronics equipment, or the like. It should be understood that various sources of light or image generating devices can be utilized such as inorganic or organic light emitting diodes (LEDs), vertical cavity surface emitting lasers (VCSELs), cathode ray tubes (CRTs), field emission displays (FEDs), electroluminescent displays, plasma displays, liquid crystal displays (LCDs), etc., which may be formed in a two-dimensional array. It should also be understood that when utilizing these alternative light or image sources, that additional filters and/or optical elements may be required in addition to those described for the preferred embodiment. The general term "light emitting devices" will be utilized throughout this disclosure for the sake of simplicity. As stated, it should further be understood that the digital scanner and method of fabrication as disclosed is additionally anticipated to aid in scanning or beam steering in other electro-optical devices, such as target tracking devices, weaponry, printing devices, image scanning devices or the like.

Referring now to the accompanying illustrations, disclosed is the digital scanner device of the present invention, fabricated according to the herein disclosed methods. It should be understood that in the preferred embodiments, the digital scanner of the present invention is generally composed of a plurality of bi-stable scanning elements, more particularly a plurality of liquid crystal cells, linearly aligned one on top of another.

The specific methods of fabrication which may be utilized in the formation of the scanner of the present invention as well as the structure itself, are described with regard to FIGS. 1–5, illustrating in simplified partial cross-sectional views the various embodiments according to the disclosed methods of fabrication. Referring now to FIG. 1, illustrated in schematic sectional view is a single individually addressable bi-stable scanning element 10 according to the first embodiment of the present invention. Bi-stable scanning element 10 is generally fabricated in a stack formation including a substrate 12 formed of any convenient optically transparent material, such as glass. A transparent conductive material layer 14 is formed on an upper surface of substrate 12. Electrically conductive material layer 14 is fabricated of an optically transparent material, such as indium tin oxide (ITO), thereby allowing the light impinging thereon to pass therethrough and defining an optically clear contact. A molecular liquid crystal alignment, or orientation, layer 16 is positioned on a surface of transparent electrically conductive material layer 14. Next, a second substrate element 18 having positioned thereupon an electrically conductive material layer 20 and a molecular liquid crystal alignment layer 22, is aligned with substrate element 12, conductive material layer 14 and alignment layer 16, thereby forming a defined area 23. The area 23 formed between molecular liquid crystal alignment layers 16 and 22 is filled with a continuous layer of liquid crystal material 24 composed of a plurality of liquid crystal molecules. Scanning element 10 is then interfaced with a bi-stable drive circuit (not shown). Each individual drive circuit for each of the plurality of bi-stable scanning elements 10 is capable of delivering voltages across the scanning elements 10 so as to provide for operation in one of an "ON" or "OFF" mode dependent upon the desired modulation of light passing therethrough. Once filled, alignment layers 16 and 22 serve to properly position and align the molecules comprising liquid crystal material 24, so as to orient the molecules in a specific direction when there exist an external stimulus, such as a voltage, acting upon the scanning element 10. Further information regarding the structure and fabrication of a liquid crystal scanner, as utilized in the present invention can be found in the following pending U.S. Patent applications: (i) pending U.S. Patent application bearing attorney docket no. CR 96-181, mailed Dec. 18, 1996, entitled "LARGE ANGLE LIQUID CRYSTAL PHASE SPATIAL LIGHT MODULATOR", (ii) pending U.S. Patent application, bearing attorney docket no. CR 96-090, mailed Dec. 18, 1996, entitled 'FAST SPEED LIQUID CRYSTAL PHASE SPATIAL LIGHT MODULATOR FOR ENHANCED DISPLAY RESOLUTION", and (iii) pending U.S. Patent application, bearing attorney docket no. CR 96-097, mailed Dec. 18, 1996, entitled "MULTI-DIRECTIONAL LIQUID CRYSTAL PHASE SPATIAL LIGHT MODULATOR FOR ENHANCED DISPLAY RESOLUTION", all assigned to the same assignee and incorporated herein by this reference.

There is positioned on an uppermost surface 27 of substrate element 18, a birefringence film/crystal 26, which additionally serves as a light output surface 28. Birefringence film/crystal 26 is typically composed of liquid crystal polymers or birefringence crystal such as calcite, lithium niobate, etc and serves to deflect/displace the optical beam polarized along the x or y axis, dependent upon the intrinsic optical axis of the birefringence film/crystal.

Figure 2:
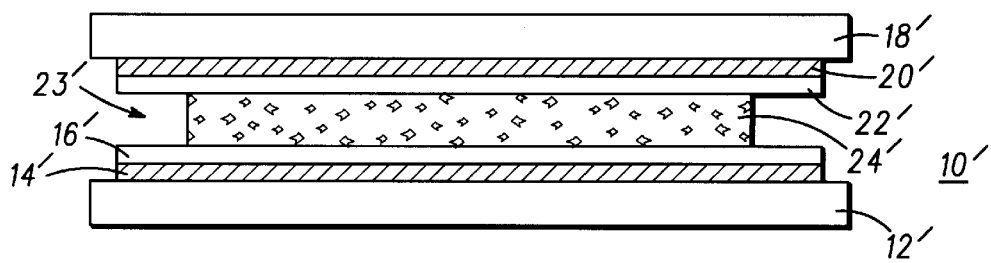
FIG. 2 is a simplified cross-sectional view of a single bi-stable scanning element according to a second embodiment of the present invention.

Referring now to FIG. 2, illustrated in simplified cross-sectional view is a single individually addressable bi-stable scanning element 10' according to a second embodiment of the present invention. It should be noted that all components similar to the components illustrated in FIG. 1, are designated with similar numbers, having a prime added to indicate the different embodiment. In this particular embodiment bi-stable scanning element 10' is fabricated to include recorded phase information within alignment layers 16' and 22' utilizing a chemically-induced or mechanically-induced molecular alignment technique or fabricated as described herein to create phase information across scanning element 10' under the influence of a ramp voltage. When fabricating recorded phase information, molecular liquid crystal alignment material layers 16' and 22' are evaporated at spaced intervals. Alignment material layers 16' and 22' are varying in pre-tilt evaporation angles across the plurality of spaced intervals, thereby creating an alignment layer varying in molecular orientation. Alignment layers 16' and 22' are thereby capable of storing phase information within each of the plurality of scanning elements 10'. In an alternative embodiment, the molecular liquid crystal alignment layer is comprised of varying polymer materials evaporated on at least one substrate element at spaced intervals, thereby storing phase information so as to alter the alignment of the molecular liquid crystal alignment layer for that specific interval and orienting a plurality of liquid crystal molecules within that specific interval according to the stored phase information. Further information regarding the structure and method of fabrication of a bi-stable scanning element, or liquid crystal cell, including recorded phase information can be found in pending U.S. patent application, Ser. No. 08/726,005, entitled "BI-STABLE NON-PIXELLATED PHASE SPATIAL LIGHT MODULATOR FOR ENHANCED DISPLAY RESOLUTION AND METHOD OF FABRICATION", filed Oct. 4, 1996, assigned to the same assignee and included herein by this reference.

Figure 3:
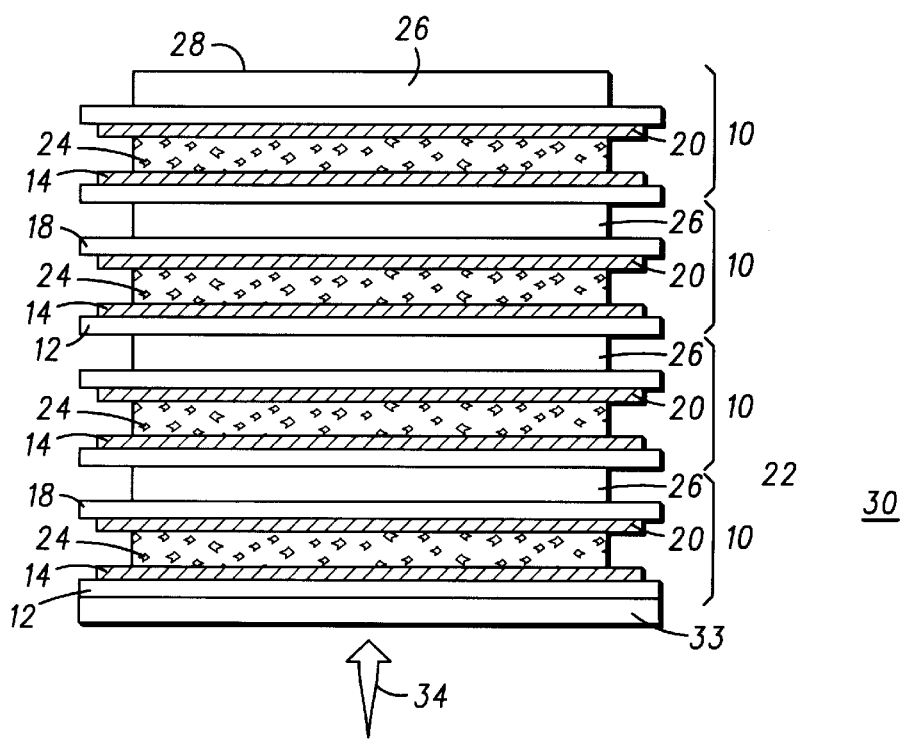
FIG. 3 is a simplified cross-sectional view of a plurality of bi-stable scanning elements which form the digital scanner according to the present invention.

Referring now to FIG. 3, illustrated in simplified cross-sectional view is a digital scanner 30 including a plurality of individually addressable scanning elements 10, fabricated according to the previously described method and structure of the first embodiment of FIG. 1. In this particular embodiment digital scanner 30 includes a means for polarizing light incident upon scanning element 10, such as a polarization film 32 positioned on a light input surface 33 of the first scanning element 10. Polarization film 32 is capable of linearly polarizing light incident thereon light input surface 33. It should be understood that in the alternative, if the input light is already polarized, no polarization film is needed. During operation digital scanner 30 deflects light 34 incident thereon by changing the polarization of light along the x and y axis, thereby deflecting/displacing light 34 to a desired angle or position.

Figure 4:
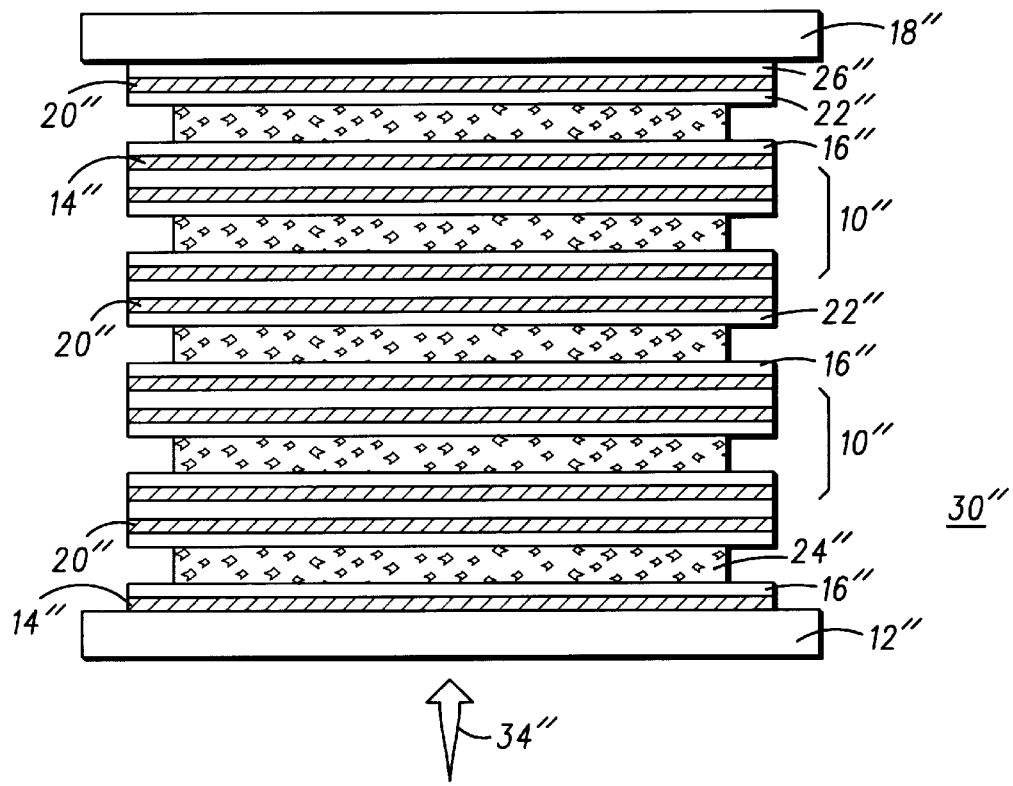
FIG. 4 is a simplified cross-sectional view of an alternative embodiment of a plurality of bi-stable scanning elements which form the digital scanner according to the resent invention.

Referring now to FIG. 4, illustrated is an alternative design of the first embodiment of the digital scanner of the present invention, designated 30". It should be noted that all components of FIG. 4 that are similar to the components illustrated in FIGS. 1 and 3, are designated with similar numbers, having a double prime added to indicate the alternative design. Digital scanner 30" is comprised of a plurality of individually addressable bi-stable scanning elements 10" fabricated generally similar to scanning elements 10 of FIG. 1, except in this particular embodiment, each individual scanning element 10" includes a plurality of conductive material layers 14" and 20", a plurality of alignment layers 16" and 22", and a birefringence film layer 26". Each individually addressable scanning element 10" is positioned one on top of the other, with conductive material layer 14" of a subsequent scanning element 10" positioned adjacent birefringence film layer 26" of the previous scanning element 10". Digital scanner 30" is thus fabricated compact in dimension by coating conductive material layer 14" of each scanning element 10" directly on the birefringence crystal/film layer 26" of the previous scanning element 10". There is provided a substrate element 12" positioned adjacent conductive material layer 14" of the first scanning element 10" and a substrate element 18" positioned adjacent birefringence film 26" of the final scanning element 10". It should be understood that substrate elements 12" and 18" are composed of a transparent material, such as optically transparent glass, thereby permitting substantially 100% of light incident thereon to pass through. In that each individual scanning element 10" which composes digital scanner 30" does not include substrate elements adjacent conductive material layers 14" and birefringence films 26", substrate element 12" and 18" serve to provide structural support to digital scanner 30". By fabricating digital scanner 30" according to this method, digital scanner 30" is fairly thin. For example, if each of the plurality of layers is approximately 3 microns thick, and digital scanner 30" includes 10 individually addressable scanning elements 10", and glass substrate elements 12" and 18" being 0.5 millimeters, then digital scanner 30" is approximately 1.1 millimeters in overall thickness. Digital scanner 30 and 30" as illustrated are composed of a finite number of individual scanning elements 10 and 10", respectively, for illustrative purposes only. Accordingly, it should be understood that scanner 30 and 30" can be fabricated to include any number of individual scanning element 10 and 10' dependent upon specific scanning application.

During operation of digital scanner 30 and 30", light is incident upon the scanner 30 and 30" and undergoes a polarization change or phase modulation within each scanning element that is activated. Accordingly, light is subsequently deflected/displaced to a desired angle or position. Each scanning element 10 or 10" deflects or displaces the light beam incident thereon at either "0", "$2^n \cdot \phi$", or "$2^n \cdot t$", where "n" is an integer, "$\phi$" is an angle shift and "t" is a position shift. Each scanning element is bi-stable and individually electronically controlled, or addressable. Accordingly, if the optical beam is to go, for example, to "581·$\phi$" or "581·t", then in a digital scanner composed of 10 scanning elements, the 10th, 7th, 3rd and 1st scanning elements are activated so that light incident thereon undergoes a change in polarization, i.e. $2^{10}+2^7+2^3+2^1$, and the remaining scanning elements are absent any polarization switching capabilities, thereby allowing light incident thereon to pass straight through without being displaced.

It should be understood that digital scanner 30 and 30" are illustrated as being composed of optically transparent material, for use when scanning in a transmissive mode. The use of optically transparent material allows for the positioning of digital scanner 30 and 30" within a miniature visual image display system, allowing for the passage of light, emitted by the light emitting display device, to pass directly through device 30 and 30". An alternative embodiment would allow scanner 30 and 30" to act as a reflective scanner (not shown) whereby scanner 30 and 30" includes reflective properties allowing for light entering device 30 and 30" to undergo a first phase modulation and upon exiting back through device 30 and 30" in response to the reflective properties, undergoing a second phase modulation.

As an example of the specific fabrication of device 30, and which would similarly hold true for scanning device 30", during the fabrication process of each individually addressable scanning element 10, a tubular glass spacer (not shown) is fixedly attached between opposed surfaces of the alignment layers 16 and 22 of each individually addressable scanning element 10 by any convenient means, such as adhesive, chemical bonding, growing and etching layers, etc. It will of course be understood that the tubular glass spacer could be formed in a variety of other embodiments and the present structure is given for purposes of this explanation. The tubular glass spacer has an inner opening defined therethrough, of sufficient size to allow for the encapsulation of the liquid crystal material 24, more particularly nematic or ferroelectric liquid crystal material. Typical examples of liquid crystal material which can be used for this purpose are disclosed in U.S. Pat. No. 4,695,650, entitled "LIQUID CRYSTAL COMPOUNDS AND COMPOSITIONS CONTAINING SAME", issued Sep. 22, 1987.

The electrically conductive material layers 14 of device 30 form a first and second electrical contact and are connected and/or adapted to have applied thereto a common potential, such as ground or some fixed voltage, which serves to apply a voltage to scanner 30. Scanner 30 operates in either an "ON" or "OFF" mode dependent upon the presence or absence of the voltage. To activate the reorientation of the recorded molecular structure of the liquid crystal material, more specifically molecules 24, the potential, or voltage, must be applied between the upper and lower contacts.

Figure 5:
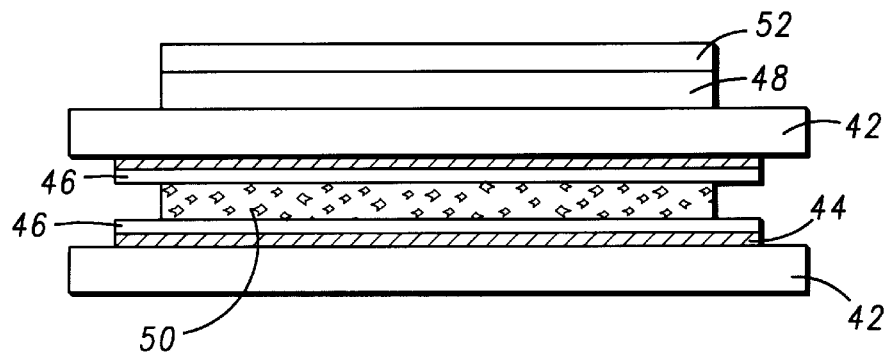
FIG. 5 is a simplified cross-sectional view of an alternative embodiment of a single bi-stable scanning element with a phase retarder according to the present invention.

Referring now to FIG. 5, illustrated is a similar partial cross-sectional view of a individually addressable scanning element 40, generally similar to scanning element 10 disclosed in FIG. 1. In general, scanning element 40 is composed of a substrate elements 42, a plurality of transparent layers of conductive material 44, a plurality of alignment layers 46, and a birefringence crystal/film 48. There is positioned therebetween the plurality of alignment layers 46, a continuous layer of liquid crystal material 50. Scanning element 40 is similar to previously described scanning element 10, except in this particular embodiment, scanning element 40 includes a phase compensator 52 positioned adjacent birefringence film 48. Phase compensator 52 is necessary for situations where the optical path length difference is sensitive and critical. Phase compensator 52 can be any type of solid phase retardation plate or nematic liquid crystal phase retarder well known in the art.

During operation of the digital scanner utilizing a change in polarization to deflect/displace the light path, the extraordinary rays (e-rays) of the incident light travel a longer optical path than the ordinary rays (o-rays) of the incident light. Phase compensator 52 having different optical indexes along the x and y direction serves to compensate for this phase difference along the e-ray and the o-ray.

Irrespective of the specific method of fabrication of the individually addressable scanning elements which compose the digital scanner of the present invention, one-dimensional and two-dimensional beam steering can be accomplished. To accomplish one-dimensional beam steering, a one-dimensional or two-dimensional light emitting device is utilized as the image source. The light passing through the digital scanner would undergo deflection in the x-direction, controlled by the absence or presence of an applied voltage upon the selected scanning elements, thus displacing the light to increase display resolution in the resultant integrated image.

To accomplish two-dimensional beam steering, two digital scanners are aligned and stacked so that the extraordinary optical axes ($N_e$) of the individual scanning elements are positioned orthogonal to each other. An image source, capable of emitting light through the plurality of scanning elements is positioned along the optical axis of the scanner. Accordingly, the light entering the scanner elements, more particularly the m x-scanning component and the n y-scanning component, undergo deflection in both the x-direction and the y-direction and is randomly accessed to $2^m \cdot 2^n$ positions, thereby displacing, or deflecting, the light to increase display resolution in the resultant integrated image.

In an alternative embodiment, an additional scanning device, constructed according to the disclosed invention, can be combined with the aforementioned two-dimensional scanner to form a three-dimensional scanner. The three-dimensional scanner includes m x-scanning components, n y-scanning components and k z-scanning components with a random-access capability to $2^m \cdot 2^n \cdot 2^k$ positions in space.

These two-dimensional and three-dimensional scanners are very useful in optical switching, optical communications, optical storage, data communication and telecommunication, three-dimensional displays, and optical sensing and tracking devices. Similar ideas can be used in space/time domain to achieve random-access to any point in space and time, being expandable to multi-dimensions. Random-access capabilities can be achieved to any point in q dimensions by constructing a scanner $2^{m1} \cdot 2^{m2} \cdot \ldots \cdot 2^{mq}$ components.

It should be understood that individual scanning elements are not limited to bi-stable devices. Devices which are n positional stable can employ the same principle to access any point in q dimensions by constructing a scanner with $n^{m1} \cdot n^{m2} \cdot \ldots \cdot n^{mq}$ components.

It should be understood that this disclosure is not limited to scanning devices, and can apply to programmable focus/defocus lenses. The material of the scanning device is not limited to the use of nematic or ferroelectric liquid crystal as disclosed in the preferred embodiment, and other types of liquid crystal materials, as well as bi-stable scanning elements utilizing other phase modulating materials are anticipated by this disclosure. It should be understood that this concept of beam steering can be utilized in all beam steerers relying on birefringence effect steering, such as PLZT steerers, or the like.

Thus, disclosed is a new and improved digital scanner having phase modulation information either recorded or created within a plurality of individually addressable scanning elements. The digital scanner operates by submitting input signals to specific scanning elements, altering the molecular structure of liquid crystal material contained therein and thereby causing light incident thereon to undergo deflection/displacement by either a phase modulation and/or a change in polarization dependent upon the configuration of the scanning elements. The digital scanner of the present invention is meant to be incorporated into a miniature visual image display system, more specifically an electro-optical system, additionally composed of a light emitting display device which serves as an image source, driver/control circuitry and optical elements (discussed presently). In addition, the digital scanner of the present invention can be utilized in the fields of optical switching, storage and computing, telecommunications, and optical tracking and sensing devices. During operation, the digital scanner of the present invention serves to shift the pixels of an individual array, groups of pixels of an array, or alternatively serves to shift the entire array, thereby creating enhanced resolution through phase modulation and/or polarization switching. Further information regarding the shifting of pixels, pixel groups, and arrays can be found in U.S. Patent application entitled "VISUAL DISPLAY SYSTEM FOR DISPLAY RESOLUTION ENHANCEMENT", Ser. No. 08/638,709, filed Apr. 29, 1996, assigned to the same assignee and incorporated herein by this reference.

A typical visual display system incorporating the digital scanner of the present invention includes various additional optical components while conveniently integrating electrical connections to the components and providing external connections thereto. Light sources, polarizers, diffusers and optics are conveniently integrated into the system which is easily integrated into portable electronic equipment. It is further disclosed that additional optical elements, such as polarizer plates or layers, refractive elements, diffractive elements, etc. may be easily positioned exterior the visual display system.

Digital scanner 30, 30" and 40 of the present invention are meant to be incorporated into any number of varying visual image display systems, some of which have been briefly described herein. These types of visual image display systems are ultimately intended for use in various types of electronic equipment, namely portable communications equipment, such as cellular and portable telephones, as well as smart-card reader devices, or the like, although it should be understood that the digital scanner 30, 30" and 40 of the present invention are additionally included for use in sensing and tracking devices, and in the fields of optical computing, optical storage, optical switching, telecommunications and data communications.

Thus, a new and improved digital scanner composed of a plurality of individually addressable scanning elements which is relatively easy and inexpensive to manufacture is disclosed. The digital scanner of the present invention is intended for use in miniature visual display systems, sensing and tracking devices, and within the fields of optical computing, optical storage, optical switching, telecommunications and data communications. The digital scanner is capable of receiving input signals, thereby activating specific scanning elements so as to displace light passing therethrough, dependent upon a desired angle shift or positional shift. The individual scanning elements are fabricated to include one of recorded phase information, phase information under the influence of an external voltage and/or polarization switching characteristics.

While we have shown and described specific embodiments of the present invention, further modifications and improvement will occur to those skilled in the art. We desire it to be understood, therefore, that this invention is not limited to the particular forms shown and we intend in the appended claims to cover all modifications that do not depart from the spirit and scope of this invention.

What is claimed is:

1. A digital scanner comprised of a plurality of individually addressable scanning elements stacked together along a common light path for serially receiving a common light beam, each of the plurality of individually addressable scanning elements being capable of operating in a plurality of discrete states in response to digital input signals applied to the digital scanner, each of the plurality of scanning elements including a pair of electrically conductive layers connected to receive one of the digital input signals to provide for the plurality of discrete states of operation including one of a straight passage and an optical deflection of a light beam passing therethrough in response to the one of the digital input signals, each of the plurality of scanning elements increasing the optical deflection of the common light beam from a previous scanning element in the optical deflection state so that the digital scanner operates in a discrete state of a plurality of discrete states dependent upon the discrete state of operation of each of the plurality of individually addressable scanning elements, wherein each of the plurality of individually addressable scanning elements is fabricated to include at least one molecular liquid crystal alignment layer, capable of altering the structural orientation of a liquid crystal material contained therein each scanning element when under the influence of an external voltage, wherein the at least one molecular liquid crystal alignment layer provides for a mechanically-induced molecular alignment of a plurality of liquid crystal molecules contained within the each of the plurality of individually addressable bi-stable scanning elements, and wherein the at least one molecular liquid crystal alignment layer is composed of an alignment material evaporated at spaced intervals on a substrate element, the alignment material varying in pre-tilt evaporation angles across a plurality of spaced intervals, thereby creating an alignment layer varying in molecular orientation, the alignment layer orienting the plurality of liquid crystal molecules within the spaced intervals, thereby storing phase information within each of the plurality of individually addressable bi-stable scanning elements.

2. A digital scanner as claimed in claim 1 wherein the digital scanner provides for one of straight passage and an optical deflection of a light beam passing therethrough by one of changing the phase of the light beam passing therethrough and changing the polarization of the light beam passing therethrough.

3. A digital scanner as claimed in claim 1 wherein the digital scanner is incorporated into a miniature visual image display, thereby providing for enhanced display resolution.

4. A digital scanner as claimed in claim 1 wherein the plurality of individually addressable scanning elements are bi-stable.

5. A digital scanner as claimed in claim 1 wherein each of the plurality of individually addressable scanning elements are individually electronically controlled.

6. A digital scanner as claimed in claim 1 wherein each of the plurality of individually addressable scanning elements is fabricated to include polarization switching capabilities.

7. A digital scanner as claimed in claim 6 wherein each of the plurality of individually addressable scanning elements is fabricated to include a birefringence film/crystal.

8. A digital scanner comprised of a plurality of individually addressable scanning elements stacked together along a common light path for serially receiving a common light beam, each of the plurality of individually addressable scanning elements being capable of operating in a plurality of discrete states in response to digital input signals applied to the digital scanner, each of the plurality of scanning elements including a pair of electrically conductive layers connected to receive one of the digital input signals to provide for the plurality of discrete states of operation including one of a straight passage and an optical deflection of a light beam passing therethrough in response to the one of the digital input signals, each of the plurality of scanning elements increasing the optical deflection of the common light beam from a previous scanning element in the optical deflection state so that the digital scanner operates in a discrete state of a plurality of discrete states dependent upon the discrete state of operation of each of the plurality of individually addressable scanning elements, wherein each of the plurality of individually addressable scanning elements is fabricated to include at least one molecular liquid crystal alignment layer, capable of altering the structural orientation of a liquid crystal material contained therein each scanning element when under the influence of an external voltage, wherein the at least one molecular liquid crystal alignment layer provides for a mechanically-induced molecular alignment of a plurality of liquid crystal molecules contained within the each of the plurality of individually addressable bi-stable scanning elements, and wherein each of the plurality of individually addressable bi-stable scanning elements is fabricated to include a molecular liquid crystal alignment layer comprised of varying polymer materials evaporated on at least one substrate element at spaced intervals, thereby storing phase information so as to change the alignment of the molecular liquid crystal alignment layer for that specific interval and orienting a plurality of liquid crystal molecules within that specific interval of each of the bi-stable scanning elements according to the stored phase information.

9. A digital scanner comprised of:

a plurality of individually addressable bi-stable scanning elements positioned in a common light path for receiving a common light beam, each of the individually addressable bi-stable scanning elements including a plurality of conductive material layers, at least one molecular liquid crystal alignment layer, and a continuous layer of liquid crystal material, each of the plurality of individually addressable bi-stable scanning elements being capable of operating in one of two discrete states, including a straight passage and an optical deflection of a light beam, in response to digital input signals applied to the digital scanner;

a plurality of bi-stable device driving circuits, one each interfaced with each of the plurality of individually addressable bi-stable scanning elements, thereby providing for one of a straight passage and an optical deflection of a light beam passing therethrough dependent upon a state of operation of each of the plurality of bi-stable device driving circuits, each of the plurality of scanning elements increasing the optical deflection of the common light beam from a previous scanning element in the optical deflection state so that the digital scanner operates in a discrete state of a plurality of discrete states dependent upon the discrete state of operation of each of the plurality of individually addressable scanning elements; and a means for polarizing light prior to passing through a first individually addressable bi-stable scanning element, wherein the plurality of individually addressable bi-stable scanning elements are fabricated to include recorded phase information within the at least one molecular liquid crystal alignment layer, thereby capable of deflecting light passing therethrough.

10. A digital scanner as claimed in claim 9 wherein the means for polarizing light includes a polarizer element positioned adjacent a first individually addressable bi-stable scanning element.

11. A digital scanner as claimed in claim 9 wherein the means for polarizing light includes a plurality of polarizer elements positioned adjacent each of the individually addressable bi-stable scanning elements.

12. A digital scanner as claimed in claim 9 wherein the plurality of bi-stable scanning elements are fabricated to include polarization switching characteristics under the influence of an external voltage, thereby capable of deflecting light passing therethrough.

13. A digital scanner as claimed in claim 12 wherein each of the plurality of bi-stable scanning elements includes a birefringence film/crystal positioned on a light output surface.

14. A digital scanner as claimed in claim 9 wherein each of the individually addressable bi-stable scanning elements deflect light passing therethrough at one of a value of 0, $2^n \cdot \square$, and $2^n \cdot t$, where n is an integer, $\square$ is an angle shift and t is a position shift.

15. A digital scanner comprised of:

a plurality of individually addressable bi-stable scanning elements positioned in a common light path for receiving a common light beam, each of the individually addressable bi-stable scanning elements including a plurality of conductive material layers, at least one molecular liquid crystal alignment layer, and a continuous layer of liquid crystal material, each of the plurality of individually addressable bi-stable scanning elements being capable of operating in one of two discrete states, including a straight passage and an optical deflection of a light beam, in response to digital input signals applied to the digital scanner;

a plurality of bi-stable device driving circuits, one each interfaced with each of the plurality of individually addressable bi-stable scanning elements, thereby providing for one of a straight passage and an optical deflection of a light beam passing therethrough dependent upon a state of operation of each of the plurality of bi-stable device driving circuits, each of the plurality of scanning elements increasing the optical deflection of the common light beam from a previous scanning element in the optical deflection state so that the digital scanner operates in a discrete state of a plurality of discrete states dependent upon the discrete state of operation of each of the plurality of individually addressable scanning elements; and a means for polarizing light prior to passing through a first individually addressable bi-stable scanning element, wherein the plurality of bi-stable scanning elements are fabricated to create phase information under the influence of an external voltage, thereby capable of deflecting light passing therethrough.

16. A method of fabricating a digital scanner comprising the steps of:

providing a plurality of optically aligned individually addressable scanning elements, each individually addressable scanning element including a plurality of conductive material layers, thereby providing for a first and a second electrical contact, at least one molecular liquid crystal alignment layer, and having contained therein a continuous layer of a liquid crystal material, each of the individually addressable scanning elements having a plurality of discreet modes, including a straight passage and an optical deflection of a light beam, in response to digital input signals applied to the first and second electrical contacts;

interfacing the plurality of individually addressable scanning elements with a drive circuit capable of delivering at least two discrete voltages across each of the plurality of individually addressable scanning elements so as to provide for operation in one of the straight passage and the optical deflection mode of a light beam dependent upon a desired modulation of light passing therethrough; and polarizing light incident upon an input surface of the digital scanner, wherein each of the plurality of individually addressable scanning elements contains recorded phase information.

17. A method of fabricating a digital scanner as claimed in claim 16 wherein the step of polarizing light incident upon an input surface of the digital scanner includes positioning a polarizing element adjacent an input surface of a first aligned individually addressable scanning element.

18. A method of fabricating a digital scanner as claimed in claim 16 wherein the step of polarizing light incident upon an input surface of the digital scanner includes positioning a polarizing element adjacent a light input surface of each individually addressable scanning elements.

19. A method of fabricating a digital scanner as claimed in claim 16 wherein each of the plurality of individually addressable scanning elements includes polarization switching characteristics.

20. A method of fabricating a digital scanner comprising the steps of:

providing a plurality of individually addressable scanning elements, each individually addressable scanning element including a plurality of layers of conductive material forming a first and a second electrical contact, at least one molecular alignment layer positioned between the plurality of layers of conductive material, and a birefringence film/crystal positioned on a light output surface of each of the individually addressable scanning elements;

filling an area defined between the first and second electrical contacts of each individually addressable scanning element with a liquid crystal material, each of the individually addressable scanning elements having a plurality of discreet modes, including a straight passage and an optical deflection of a light beam, in response to digital input signals applied to the first and second electrical contacts;

optically aligning the plurality of individually addressable scanning elements one on top of another so that each of the plurality of scanning elements increases the optical deflection of the common light beam from a previous scanning element in the optical deflection state and the digital scanner operates in a discrete state of a plurality of discrete states dependent upon the discrete state of operation of each of the plurality of individually addressable scanning elements; and interfacing each of the plurality of individually addressable scanning elements with a drive circuit capable of exerting an electric field upon each of the scanning elements so as to provide for operation in one of the straight passage and the optical deflection modes of light passing therethrough, wherein the plurality of individually addressable scanning elements includes recorded phase information.

21. A method of fabricating a digital scanner as claimed in claim 20 wherein the liquid crystal material includes one of ferroelectric and nematic liquid crystal material.

* * * * *